United States Patent
Kawato et al.

(10) Patent No.: US 6,327,123 B1
(45) Date of Patent: Dec. 4, 2001

(54) MAGNETIC HEAD EMPLOYING MAGNETORESISTIVE SENSOR AND MAGNETIC STORAGE AND RETRIEVAL SYSTEM

(75) Inventors: Yoshiaki Kawato; Hiroshi Fukui; Kenichi Meguro, all of Hitachi; Yoshihiro Hamakawa, Urawa, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/368,472

(22) Filed: Aug. 4, 1999

(30) Foreign Application Priority Data

Aug. 5, 1998 (JP) .................................. 10-221644

(51) Int. Cl.[7] .............................. G11B 5/127; G11B 5/39
(52) U.S. Cl. .................................. 360/324.11; 360/324.2
(58) Field of Search ..................... 360/324.1, 324.11, 360/327.23, 327.31, 324.2, 324, 313, 110

(56) References Cited

U.S. PATENT DOCUMENTS

| | | | | |
|---|---|---|---|---|
| 3,840,898 | * | 10/1974 | Bajorek et al. | 360/327.23 |
| 5,206,590 | * | 4/1993 | Dieny et al. | 324/252 |
| 5,465,185 | * | 11/1995 | Heim et al. | 360/324.11 |
| 5,583,725 | * | 12/1996 | Coffey et al. | 360/324.11 |
| 5,668,688 | * | 9/1997 | Dykes et al. | 360/324.1 |
| 5,998,040 | * | 12/1999 | Nakatani et al. | 428/611 |
| 6,023,395 | * | 2/2000 | Dill et al. | 360/324.2 |
| 6,101,072 | * | 8/2000 | Hayashi | 360/324 |
| 6,105,237 | * | 8/2000 | Gill | 29/603.08 |
| 6,117,569 | * | 9/2000 | Lin et al. | 428/692 |

FOREIGN PATENT DOCUMENTS

| | | | |
|---|---|---|---|
| 0687917 A2 | * | 12/1995 | (EP) . |
| 07169026A | | 7/1995 | (JP) . |
| 08007235A | | 1/1996 | (JP) . |

\* cited by examiner

Primary Examiner—Robert S. Tupper
Assistant Examiner—Julie Anne Watko
(74) Attorney, Agent, or Firm—Kenyon & Kenyon

(57) ABSTRACT

A magnetic head is provided with a magnetoresistive sensor scarcely susceptible to heat and provided with a fixed layer capable of creating a pinned magnetic field of a sufficient intensity. The magnetic head comprises a magnetoresistive effect film having a free layer (21), a fixed layer (105) and an intermediate layer (104), and a pair of electrodes (25a, 25b) for supplying current to the magnetoresistance effect film. The free layer (21) is formed of a ferromagnetic material and the intermediate layer (104) is formed of a nonmagnetic material. The fixed layer (105) has a first ferromagnetic film (22), a second ferromagnetic film (24) and a nonmagnetic film (23) sandwiched between the first and the second ferromagnetic films (22, 24). The second ferromagnetic film (24) farther from the free layer (21) than the first ferromagnetic layer (22) is formed of a material having the property of permanent magnets. The magnetization of the fist ferromagnetic film (22) and that of the second ferromagnetic film (24) are coupled in an antiferromagnetic coupling fashion.

14 Claims, 13 Drawing Sheets

MAGNETIC HEAD EMPLOYING MAGNETORESISTIVE SENSOR AND MAGNETIC STORAGE AND RETRIEVAL SYSTEM

BACKGROUND OF THE INVENTION

The present invention relates to a magnetic head employing a magnetoresistive sensor and a magnetic storage and retrieval system.

Increase in recording density is essential to magnetic storage and retrieval apparatuses, particularly, magnetic disk apparatuses to meet both a progressively increasing demand for capacity increase and a demand for apparatus miniaturization. There are many problems to be solved to achieve increase in recording density. The reproducing head for reading signals magnetically recorded on a recording medium and converting the signals into electric signals is a key device of a magnetic disk drive(apparatus). Miniaturization according to recording density and sensitivity enhancement are essential requisites for the reproducing head.

Recently, MR heads employing a magnetoresistive sensor are used as a reproducing head capable of meeting those two essential requisites. The MR head is capable of producing signals at an S/N ratio (signal-to-noise ratio) higher than that at which the conventional inductive head produces signals. The magnetoresistance effect currently used by the MR head is called an anisotropic magnetoresistance effect (AMR effect). The AMR effect is the dependence of the resistance of a magnetic body when a current flows through the magnetic body on the angle between the direction of magnetization and the direction of the current. It is known that the AMR effect is capable of causing resistance changes in the range of about 2% to about 5%. Recording density which can be achieved by the MR head using the AMR effect is several gigabits per square inch at the highest. The magnetoresistance effect, which is more sensitive than the AMR effect, must be used to achieve recording at a higher recording density. The giant magnetoresistance effect (GMR effect) is a prospective means for achieving recording at a higher recording density.

The GMR effect is the variation of the electrical resistance of a multilayer film formed by alternately laminating magnetic metallic films and nonmagnetic metallic films according to angles between the directions of magnetization of the magnetic metallic films. The GMR effect achieves a large resistance change ratio exceeding 5% at a room temperature. The most prospective multilayer film for application to a magnetic head is a spin valve film. The spin valve film consists substantially of four layers. The spin valve film comprises two ferromagnetic layers and a nonmagnetic layer sandwiched between the ferromagnetic layers. An antiferromagnetic film is laminated to one of the ferromagnetic layers. Generally, the ferromagnetic layer combined with the antiferromagnetic layer is called a fixed layer and the other ferromagnetic layer is called a free layer. The direction of magnetization of the fixed layer is fixed by the exchange interaction of the fixed layer and the antiferromagnetic layer so that the angle between the direction of magnetization of the free layer and that of the fixed layer is 90°. In view of the application of the spin valve film to a magnetic head, it is desirable that the free layer have a direction of magnetization along track width and the fixed layer has a direction of magnetization along the height of elements. The basic construction of a head employing the spin valve film is disclosed in, for example, JP-A No. Hei 4-358310.

It is known that device errors which have not been experienced by a magnetic disk drive provided with an inductive head arise when an MR head is applied to a magnetic disk drive(apparatus). The most significant one of the device errors is the vertical asymmetry of reproduced waveforms attributable to the dependence of the magnitude of output pulses corresponding to a magnetic field created by the recording magnetization of the medium on the polarity of the magnetic field.

In the spin valve MR head, when the direction of magnetization of the fixed layer is fixed firmly in the direction of element height (direction along a normal to the recording medium), and the direction of magnetization of the free layer is ideally free to turn about the longitudinal direction of element (direction along the width of tracks), the vertical asymmetry will not occur. The direction of magnetization of the fixed layer is firmly pinned down (fixed) in the direction of element height by a unidirectional anisotropy based on the exchange interaction between the ferromagnetic layer and the antiferromagnetic layer to achieve such an ideal arrangement of the directions of magnetization. However, if the direction of magnetization of the fixed layer is pinned down infirmly and the direction of magnetization of the fixed layer is unstable in an external magnetic field, part of the magnetic flux generated by the magnetization of the recording medium leaks into the fixed layer and turns the direction of magnetization of the fixed layer. Consequently, the magnetic flux that flows into the free layer is reduced and the dynamic range of rotation of the direction of magnetization of the free layer is limited. In such a case, since the magnetic flux that flows into the fixed layer is dependent on the direction of magnetic flux, the amount of rotation of the direction of magnetization of the free layer varies according to the direction of the magnetic field created by the recording medium and, consequently, the vertical asymmetry of playback signals is enhanced.

Although the free layer is directed substantially in the longitudinal direction by the intrinsic uniaxial anisotropy of the ferromagnetic layer, the uniformity of magnetization distribution of the free layer is disturbed by a static magnetic field created by the magnetization of the fixed layer and hence it is possible that the linearity of playback signals is deteriorated.

JP-A No. Hei 7-169026 proposes, to improve the distribution of magnetization in the free layer, a laminated film having a fixed layer consisting of a ferromagnetic film, a nonmagnetic metal film and a ferromagnetic film laminated in that order. In the fixed layer, the two ferromagnetic films are coupled by antiferromagnetic coupling through the nonmagnetic metal film to magnetize the two ferromagnetic films so that their magnetic moments are aligned in an antiparallel fashion. The direction of magnetization of one of the ferromagnetic films of the fixed layer is fixed by the exchange coupling of the same ferromagnetic film and the antiferromagnetic film contiguous with the fixed layer. Since the magnetic moment of the ferromagnetic film is nullified, the substantial influence of the static magnetic field of the fixed layer on the free layer is negated.

JP-A No. Hei 8-7235 discloses a construction having a laminated fixed layer consisting of a ferromagnetic film, a nonmagnetic metal film and a ferromagnetic film laminated in that order similar to the fixed layer disclosed in JP-A No. Hei 7-169026, and not employing any antiferromagnetic layer. In this construction, the directions of magnetization of the two ferromagnetic films can be fixed only by the uniaxial magnetic anisotropy of the ferromagnetic films.

SUMMARY OF THE INVENTION

In the arrangement mentioned in JP-A No. Hei 7-169026, the direction of magnetization of one of the ferromagnetic films of the fixed layer is fixed by the exchange coupling of the ferromagnetic film and the antiferromagnetic film. However, the exchange coupling is affected greatly by temperature. For example, suppose that the ferromagnetic film is formed of an Fe-Mn alloy, which is disclosed herein. Then, an exchange coupling magnetic field will disappear when the temperature is 130° C. at the highest. Therefore, it is possible that the fixed layer become unable to be pinned down by heat applied thereto during the manufacture of the head.

In the arrangement mentioned in JP-A No. Hei 8-7235, the fixed layer is pinned down only by the uniaxial anisotropy of the ferromagnetic film. Therefore, the intensity of an available pinning magnetic field is on the order of several tens oersteds. When there is used a recording medium creating a magnetic field of an intensity on the order of several hundreds oersteds on the air bearing surface (ABS) or when the fixed layer is exposed to the leakage flux of the recording head, the direction of magnetization of the fixed layer becomes unstable causing the deterioration of playback signals.

Accordingly, it is an object of the present invention to provide a magnetic head employing a magnetoresistive sensor provided with a fixed layer unsusceptible to heat, capable of obtaining a pinning magnetic field of a sufficient intensity.

With the foregoing object in view, according to one aspect of the present invention, a magnetic head comprises a magnetoresistance effect film including a free layer, a fixed layer and an intermediate layer sandwiched between the free layer and the fixed layer; and a pair of electrodes to supply a current to the magnetoresistance effect film; in which the free layer is formed of a ferromagnetic material, the intermediate layer is formed of a nonmagnetic material, and the fixed layer comprises first and second ferromagnetic films and a nonmagnetic film sandwiched between the first and the second ferromagnetic films, the second ferromagnetic film farther from the free layer than the first ferromagnetic film is formed of a material having the property of permanent magnets, and the magnetization of the first ferromagnetic film and that of the second ferromagnetic film are coupled in an antiferromagnetic coupling fashion.

DETAILED DESCRIPTION OF THE PREFERRED EMBODIMENTS

First Embodiment

A magnetic head in a first embodiment according to the present invention will be described with reference to FIGS. 1 and 13.

Figure 4:
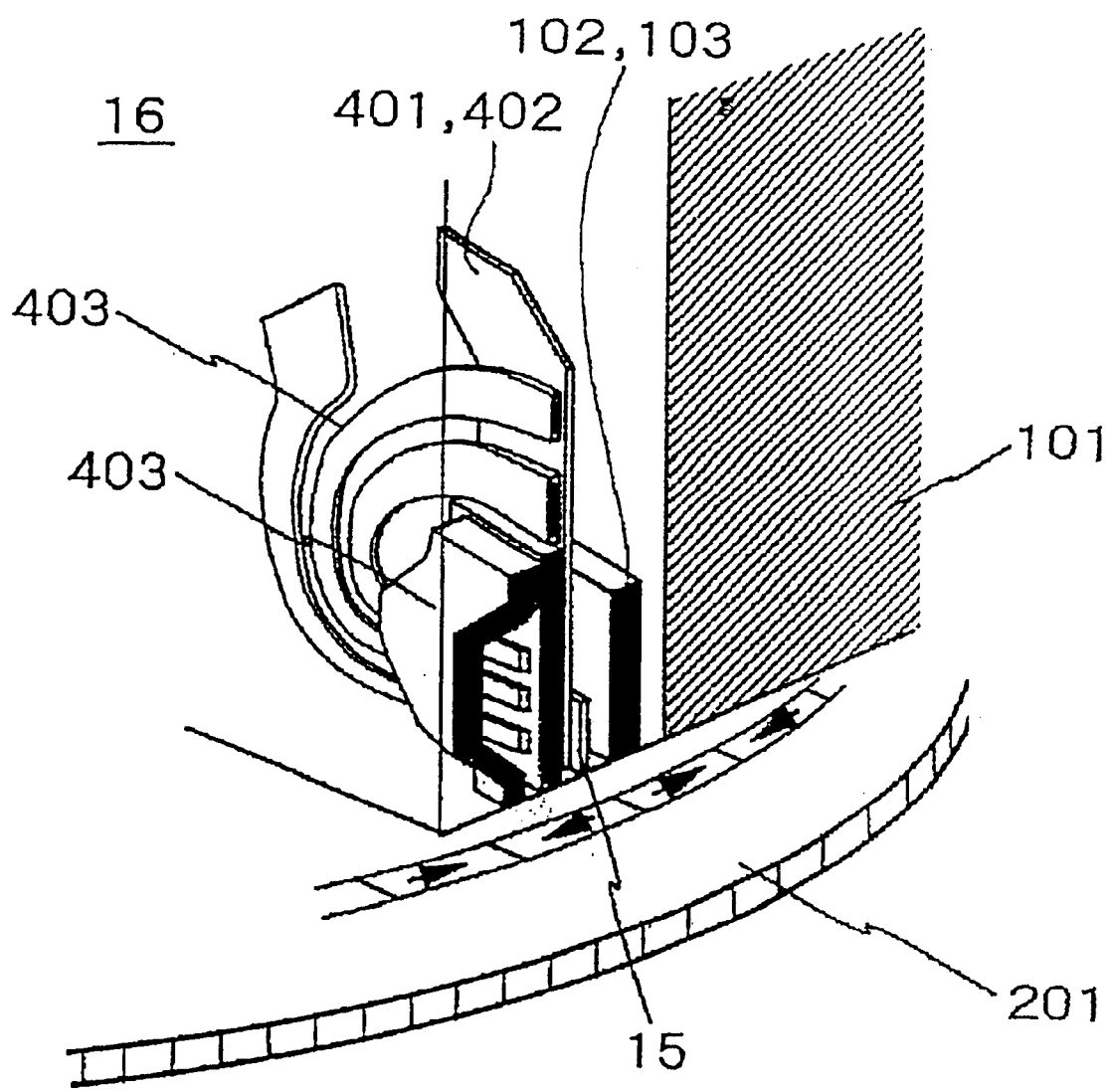
FIG. 4 is a typical perspective view of assistance in explaining the positional relation between the magnetic head shown in FIG. 1 and a recording medium.
Figure 13:
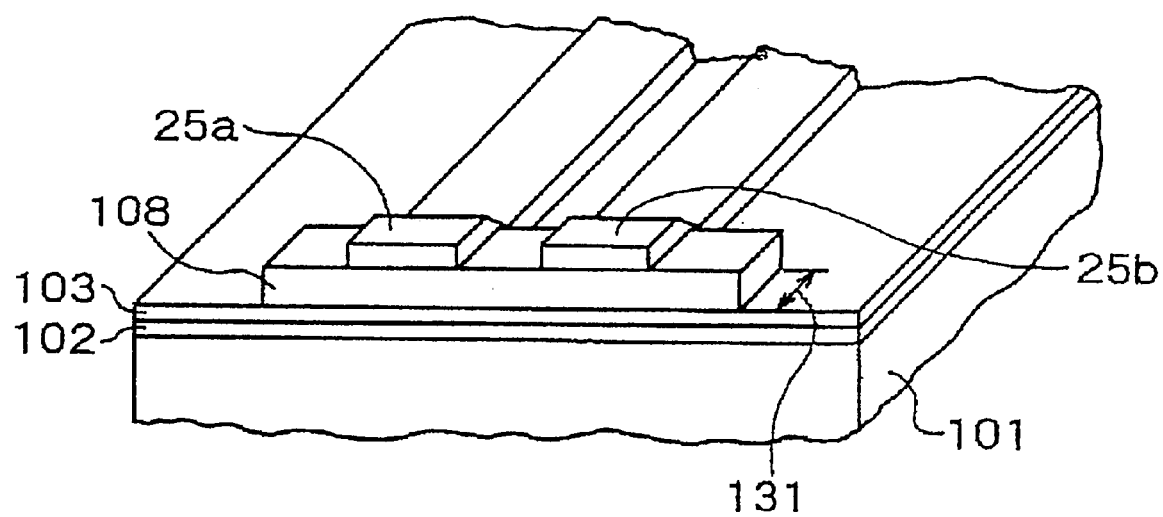
FIG. 13 is a fragmentary perspective view of the magnetic head provided with the magnetoresistive sensor shown in FIG. 1.

A magnetic shielding film 102 and an insulating gap film 103 are formed in that order on a substrate 101 formed of a nonmagnetic material, such as a ceramic material as shown in FIG. 13. The magnetic shielding film 102 shields a magnetoresistive sensor 15 formed on the substrate 101 from magnetic effects from the side of the substrate 101. The magnetoresistive sensor 15 is disposed on the gap film 103. The magnetoresistive sensor 15 comprises a spin valve film 108 formed on the gap film 103, and a pair of electrodes 25a and 25b formed on the spin valve film 108. As shown in FIG. 1, the spin valve film 108 is formed by laminating a base layer 107, a free layer 21, a nonmagnetic intermediate layer 104, a fixed layer 105 and a cap layer 106. As shown in FIG. 4, a gap film 401 and a shielding film 402 are formed on the magnetoresistive sensor 15, and a recording inductive head 403 is mounted on the shielding film 402.

The fixed layer 105 is a three-layer structure consisting of a first ferromagnetic film 22, a nonmagnetic film 23 and a second ferromagnetic film 24. The first ferromagnetic film 22 on the side of the free layer 21 is formed of Co (cobalt). The second ferromagnetic film 24 on the outer side is formed of a Co—Cr—Pt (cobalt-chromium-platinum) alloy, which is a hard ferromagnetic material, i.e., a hard material having the property of a permanent magnet. The direction 3 of magnetization of the second ferromagnetic film 24 of the hard ferromagnetic material is determined by magnetization in a manufacturing process. The direction 3 of magnetization is fixed stably and does not change even if the second ferromagnetic film 24 is exposed to a high temperature in the manufacturing process and even if the magnetic head is used in an environment of an elevated temperature. The material and the thickness of the nonmagnetic film 23 are determined selectively to couple the ferromagnetic films 22 and 24 in an antiferromagnetic coupling fashion. In this embodiment, the nonmagnetic film 23 is formed of Ru (ruthenium). The direction 2 of magnetization of the first ferromagnetic film 22 and the direction 3 of magnetization of the second ferromagnetic film 24 are aligned in an antiparallel fashion. The second ferromagnetic film 24 is magnetized in a direction 3 of magnetization shown in FIG. 2 to fix the direction 2 of magnetization of the first ferromagnetic film 22 in the direction shown in FIG. 2. The intensity of a coupling magnetic field for antiferromagnetic coupling in this case is as high as about 5 kOe and hence the direction 2 of magnetization of the first ferromagnetic film 22 can firmly be pinned down.

Figure 2:
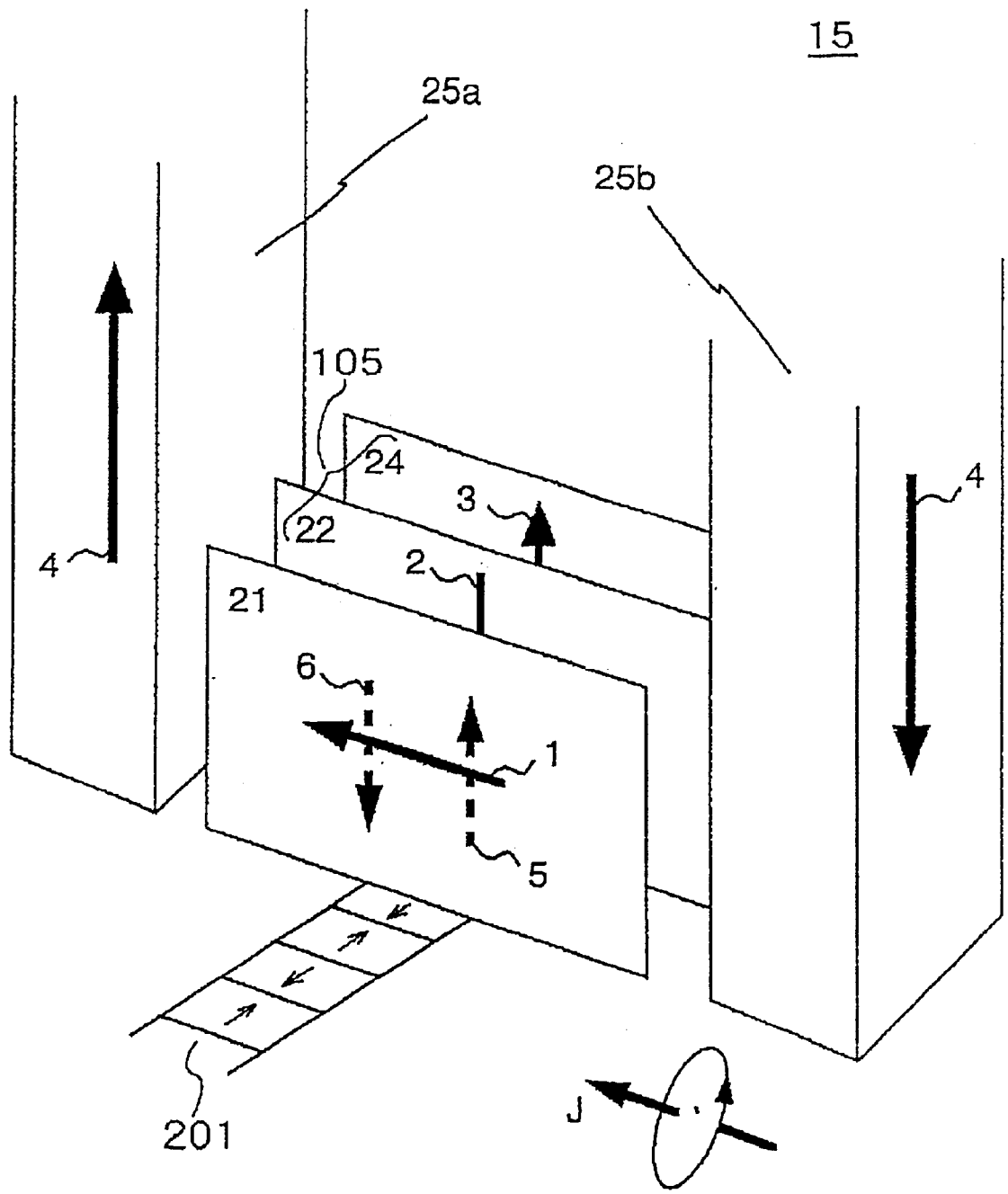
FIG. 2 is a perspective view of assistance in explaining the directions of magnetization of a fixed layer and a free layer included in the magnetoresistive sensor of the magnetic head shown in FIG. 1, and the direction of current.

The direction 1 of magnetization of the free layer 21 is perpendicular to the direction 2 of magnetization of the first ferromagnetic film 22 by uniaxial anisotropy as shown in FIG. 2. Thus, the respective directions of magnetization of the free layer 21 and the ferromagnetic layer 22 on the opposite sides of the intermediate layer 104 are perpendicular to each other to form the construction of a spin valve film.

As shown in FIG. 2, a. current 4 is supplied through the pair of electrodes 25a and 25b to the spin valve film 108. The electrodes 25a and 25b are connected to a current source which supplies the current 4, and a sense current source and a signal sensing circuit 34 which detect a resistance change ΔR in the resistance of the spin valve film 108 through the detection of a change in the current 4.

Figure 3:
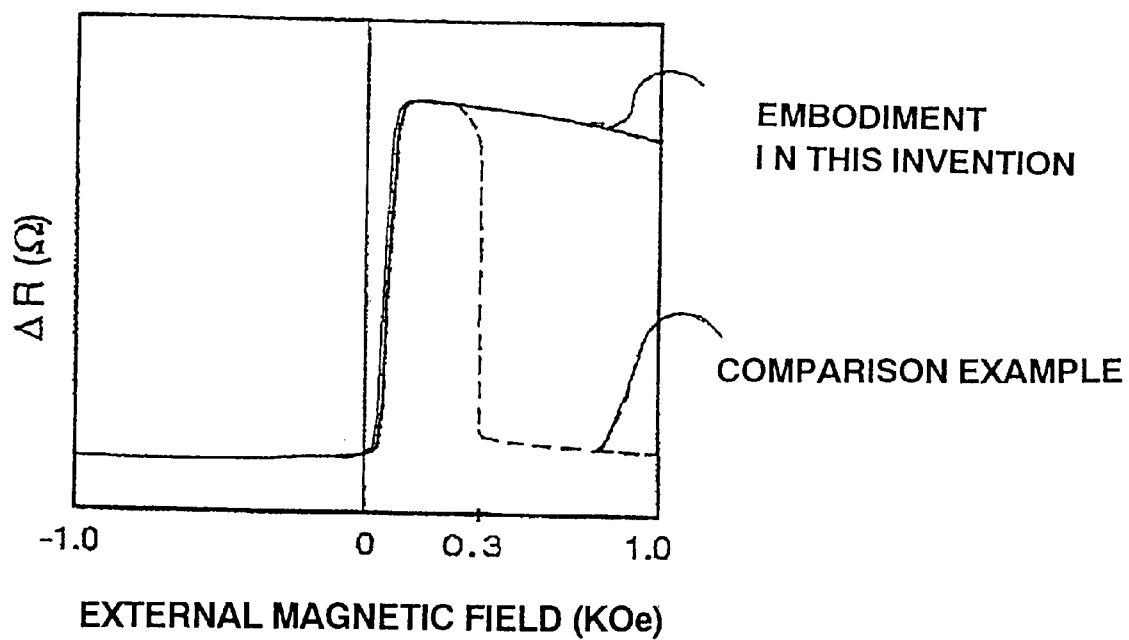
FIG. 3 is a graph showing the variation of the resistance of the magnetoresistive sensor of the magnetic head shown in FIG. 1 with the intensity of an external magnetic field applied to the magnetoresistive sensor.

An external magnetic field aligned in an antiparallel fashion with the direction of magnetization of the second ferromagnetic film 24 was applied to the spin valve film 108, the current 4 was supplied from the sense current source and the signal sensing circuit 34 and the resistance change ΔR was measured to evaluate the firmness of pinning down the fixed layer 105. A structure in a comparative example similar to a structure disclosed in JP-A No. Hei 3-337905 was fabricated. The structure in the comparative example had a ferromagnetic film of Co instead of the second ferromagnetic film 24 of the hard magnetic material and an antiferromagnetic film is formed contiguously with the outer side of the ferromagnetic film 24 to fix the direction of magnetization of the ferromagnetic film of Co by exchange coupling. Resistance change ΔR in this comparative example was measured. Measured results are shown in FIG. 3. As obvious from FIG. 3, resistance change ΔR of the spin valve film 108 of the magnetoresistive sensor 15 could be measured stably when the intensity of the external magnetic field was in the range of −1.0 to 1.0 kOe. The direction 2 of magnetization of the first ferromagnetic film 22 of the magnetoresistive sensor in the comparative example was inverted when the intensity of the external magnetic field was about 0.3 kOe and the magnetoresistive sensor malfunctioned. Thus, it was proved that the fixed layer 105 of the magnetoresistive sensor 15 is pinned firmly down.

In the first embodiment, an upward magnetic field 5, as viewed in FIG. 2, is applied to the free layer 21 when the current 4 is supplied so as to flow from the electrode 25a toward the electrode 25b. On the other hand, layer coupling force acting between the free layer 21 and the first ferromagnetic film 22 acts to align the respective directions of magnetization of the free layer 21 and the first ferromagnetic film 22 in parallel. Therefore, a downward magnetic field 6 is applied to the free layer 21. The upward magnetic field 5 and the downward magnetic field 6 can be made to balance each other by properly adjusting the intensity of the current 4 and the thickness of the intermediate layer 104. Thus the direction 1 of magnetization of the free layer 21 can be directed substantially uniformly in the direction shown in FIG. 2 when a recording medium 201 does not create any magnetic field. Consequently, an ideal arrangement the directions of magnetization in which the direction 1 of magnetization of the free layer 21 is at an angle of 90° to the direction 2 of magnetization of the first ferromagnetic film 22 of the fixed layer 105 can be achieved.

In the first embodiment, the shielding film 102 is formed of a Ni—Fe alloy, the gap film 103 is formed of $Al_2O_3$, the base layer 107 is formed of Ta, the free layer 21 is formed of a Ni—Fe alloy, the intermediate layer 104 is formed of Cu, and the upper cap layer 106 is formed of Ta. The gap film 401 is formed of the same material as the gap film 103, and the shielding film 402 is formed of the same material as the shielding film 102.

Figure 1:
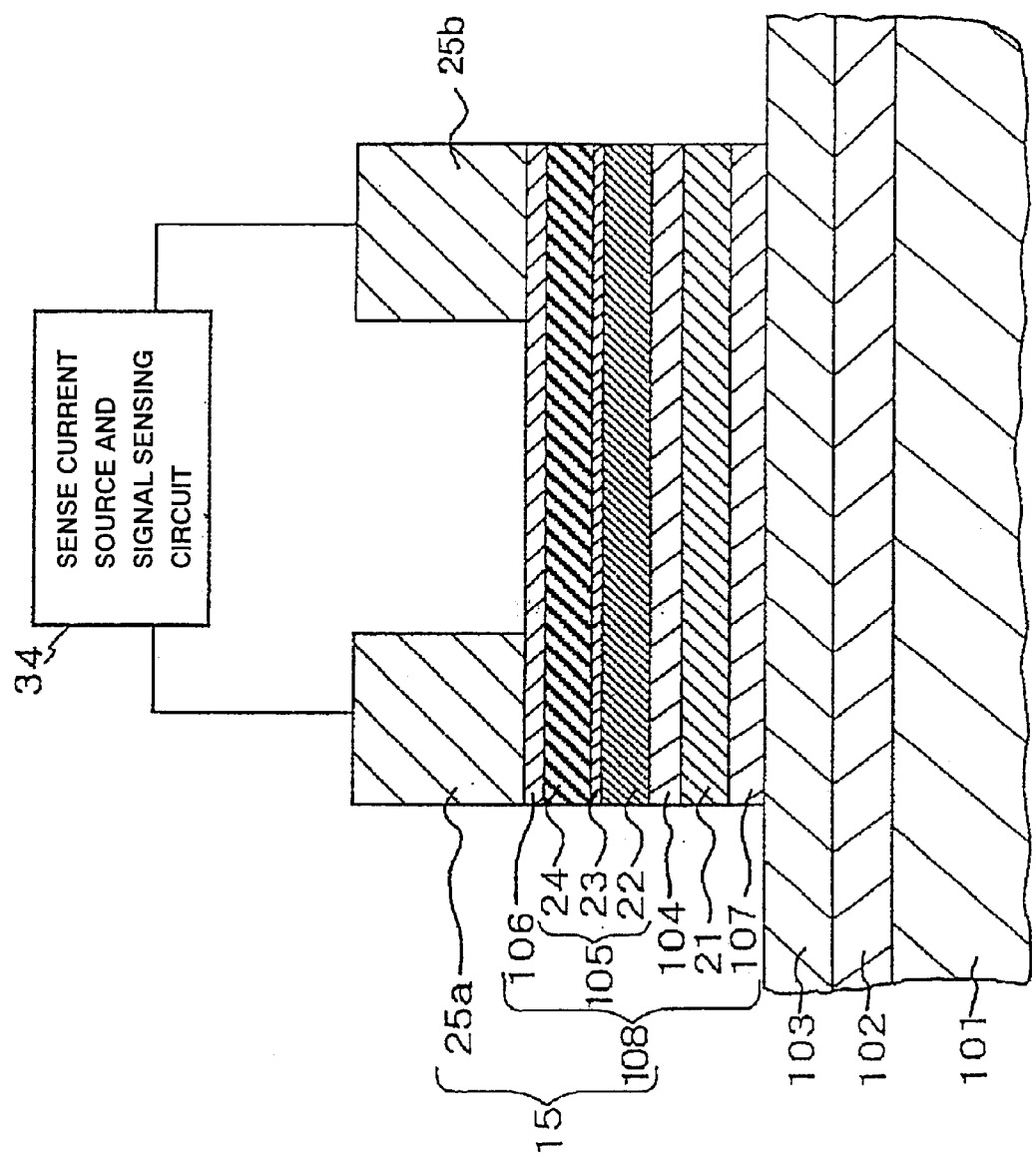
FIG. 1 is a fragmentary, typical sectional view of a magnetic head in a first embodiment according to the present invention provided with a magnetoresistive sensor.

A procedure for fabricating the magnetic head shown in FIG. 1 will briefly be described. The shielding film 102, the insulating gap film 103, the base layer 107, the free layer 21, the nonmagnetic intermediate layer 104, the first ferromagnetic film 22, the nonmagnetic film 23, the second ferromagnetic film 24 and the cap layer 106 are formed in that order on the substrate 101. The free layer 21 is formed in an external magnetic field of the same direction as the direction 1 of magnetization. The first ferromagnetic film 22 of the fixed layer 105 is formed in an external magnetic field of the same direction as the direction 2 of magnetization. The spin valve film 108 is patterned in a shape as shown in FIG. 13. An electrode film is formed over the spin valve film 108 and is patterned to form the electrodes 25a and 25b. Then, the gap film 401 and the shielding film 402 are formed over the magnetoresistive sensor 15, and the recording inductive head 403 is formed. The second ferromagnetic film 24 is magnetized after the same has been formed or after the magnetic head has been completed. The second ferromagnetic film 24 is magnetized by applying a magnetic field thereto in the direction 3 of magnetization of the second ferromagnetic film 24 at an ordinary temperature. The direction 3 of magnetization of the second ferromagnetic film 24 is fixed in the direction shown in FIG. 2. When the second ferromagnetic film 24 is thus magnetized, the direction 2 of magnetization of the first ferromagnetic film 22 is pinned down so that the directions 2 and 3 of magnetization are aligned in an antiparallel fashion.

In those processes of fabricating the magnetic head, the direction of magnetization of the second ferromagnetic film 24 is stable under heat and hence the fixing of the direction 2 of magnetization of the first ferromagnetic film 22 coupled with the second ferromagnetic film 24 in an antiparallel fashion is stable under heat. Accordingly, the direction of the direction 2 of magnetization of the first ferromagnetic film 22 will not change even if the first ferromagnetic film 22 is heated at a high temperature after the second ferromagnetic film 24 has been magnetized. Since the second ferromagnetic film 24 may be magnetized at an ordinary temperature, the second ferromagnetic film 24 may be magnetized after the completion of the film forming processes or after the magnetic head has been completed. Accordingly, restrictions on the fabricating processes are reduced and the magnetic head can easily be fabricated.

Signals were recorded on and reproduced from the recording medium (magnetic disk) 201 by the magnetic head provided with the thus manufactured magnetoresistive sensor 15 and the inductive head as shown in FIG. 4. The playback signals were not vertically asymmetric and could normally be reproduced. Since the direction 3 of magnetization of the second ferromagnetic film 24 does not change even if the magnetic head is used in an environment of an elevated temperature, the direction 2 of magnetization of the first ferromagnetic film 22 is pinned firmly down in the direction shown in FIG. 2 and hence the signals can normally be reproduced. The magnetic head in the first embodiment of the present invention is capable of properly functioning at high temperatures.

A magnetic storage and retrieval apparatus provided with the magnetic head shown in FIG. 4 will be described with reference to FIG. 5.

The magnetic head 16 shown in FIG. 4 is supported on a positioning mechanism 32 by a cantilever plate spring 502. The recording medium (magnetic disk) 201 is driven for rotation by a spindle motor 31. A control system 33 has a data record/reproduction system 134 and a mechanical control system 501. The data record/reproduction system 134 comprises a sense current source and a signal sensing circuit 34. The electrodes 25a and 25b of the magnetoresistive sensor 15 of the magnetic head 16 are connected to the sense current source and the signal sensing circuit 34. In FIG. 5, a coding-and-recording unit is omitted.

The magnetic head 16 is sought on a predetermined position of the recording medium 201 being rotated at high speeds by the spindle motor 31 by subjecting to closed-loop controlling through the control system 33 and the positioning mechanism 32. The sense current source and the signal sensing circuit 34 supplies a current 4 to the magnetic head 16 and detects resistance changes ΔR. The data record/reproduction system 134 reproduces information from the resistance changes ΔR. As mentioned above, playback signals reproduced by the magnetic head 16 are symmetrical and are not distorted significantly. Therefore, the magnetic storage and retrieval apparatus is capable of high-density data recording and of high-speed data transfer. Since the fixed layer 105 of the magnetic head 16 is effectively pinned down even at a high temperature, the magnetic storage and retrieval apparatus is unsusceptible to temperature variation.

Figure 5:
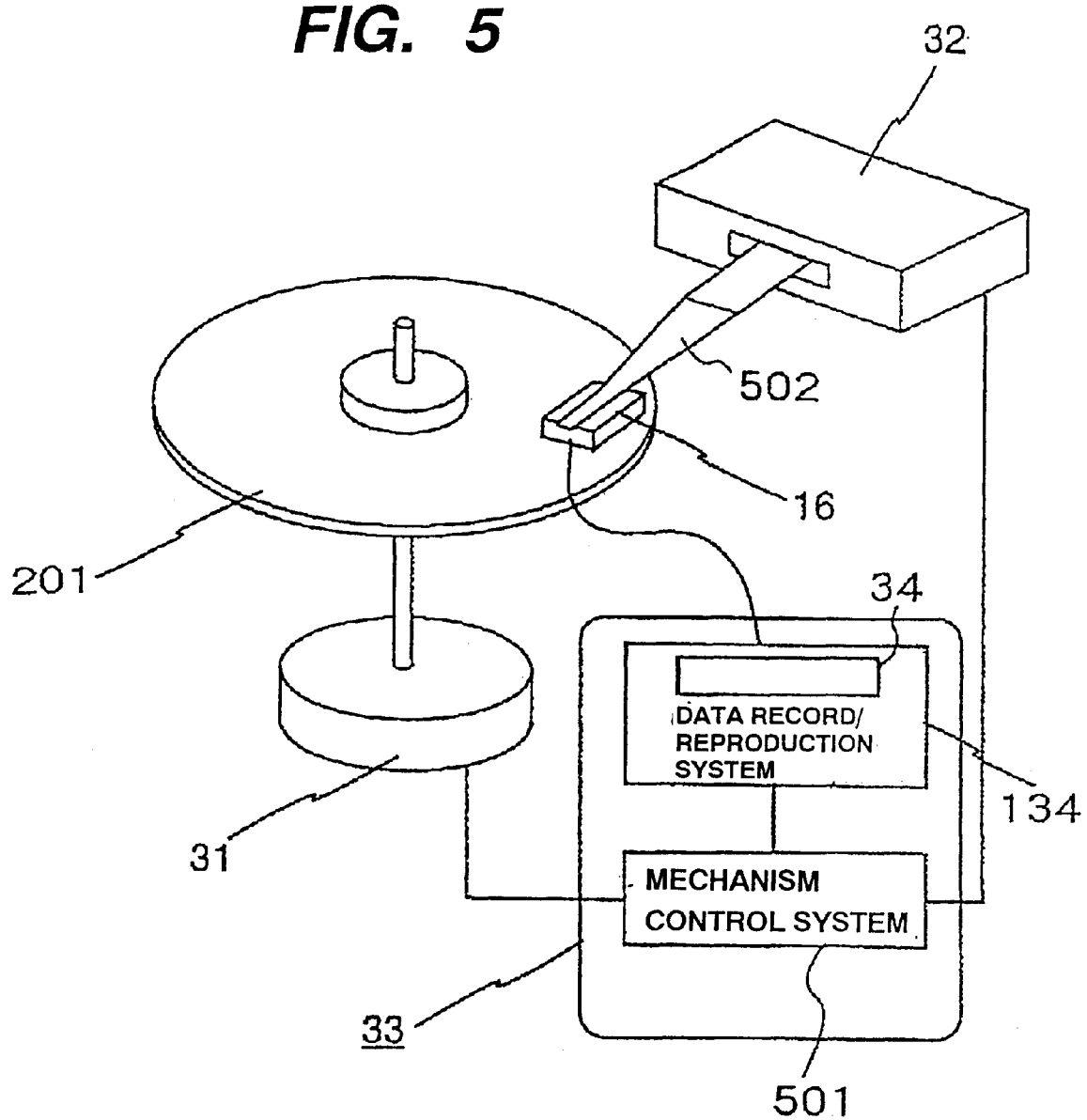
FIG. 5 is a perspective view of assistance in explaining the general construction of a magnetic storage and retrieval apparatus employing the magnetic head shown in FIG. 1.

In the magnetic storage and retrieval apparatus shown in FIG. 5, when the current 4 is supplied to the magnetoresistive sensor 15 of the magnetic head 16 in a constant-voltage mode, the variation of the vertical asymmetry of the playback signals can be suppressed even if the magnetoresistive sensors 15 of different magnetic heads 16 have different element height 131 (FIG. 13), and the magnetic head 16 is able to balance the current magnetic field 5 and the layer coupling magnetic field 6 shown in FIG. 2. Since tolerance on the element height 131 is large, the yield of the magnetic head in fabricating process can be improved.

Second Embodiment

A magnetic head in a second embodiment according to the present invention will be described with reference to FIG. 6.

Figure 6:
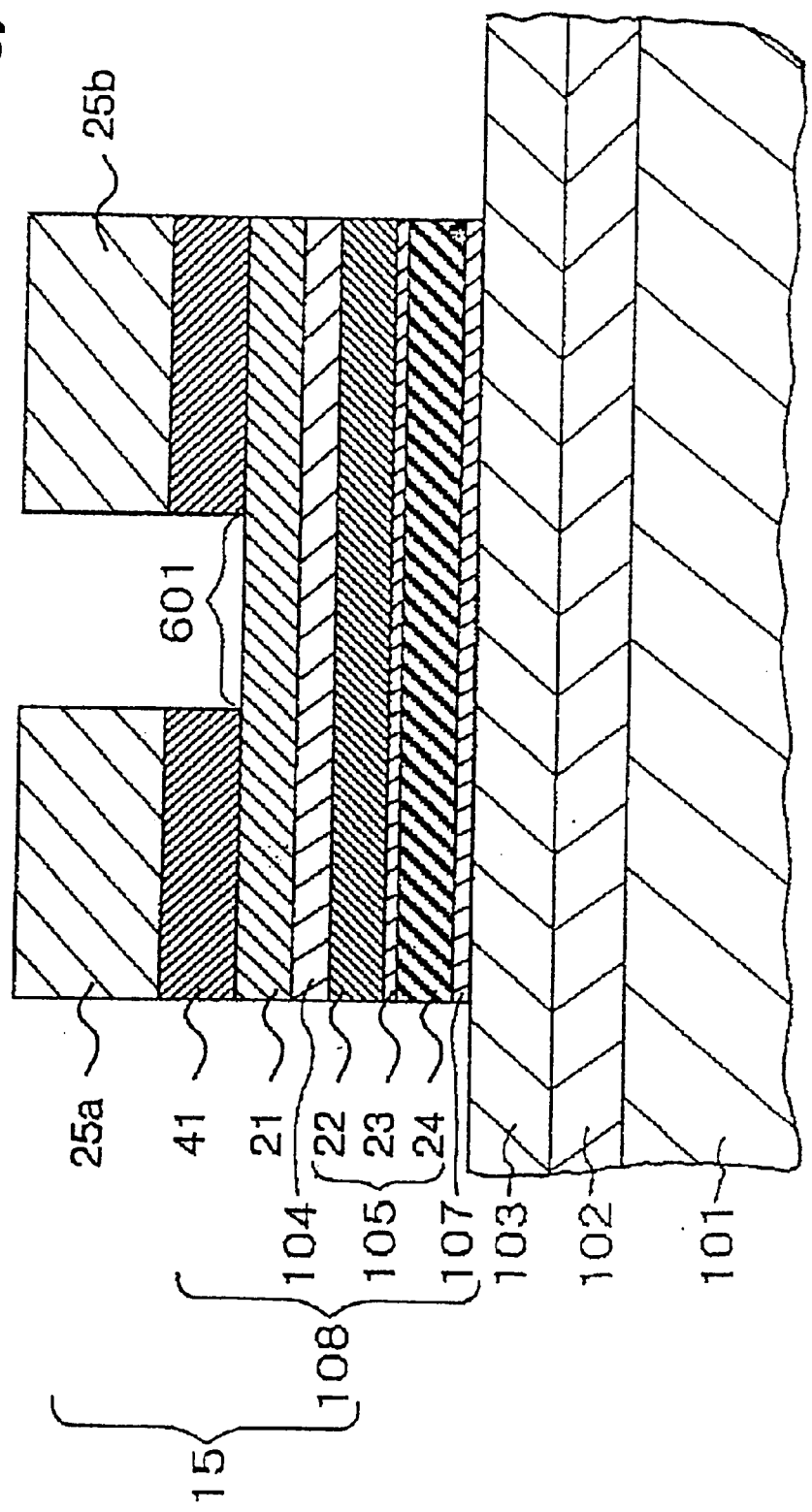
FIG. 6 is a fragmentary, typical sectional view of a magnetic head in a second embodiment according to the present invention provided with a magnetoresistive sensor.

Referring to FIG. 6, a magnetoresistive sensor 15 included in the magnetic head in the second embodiment is similar to the magnetoresistive sensor 15 of the magnetic head shown in FIG. 1. The positional relation between a fixed layer 105 and a free layer 21 of the magnetic head in the second embodiment is reverse to that between the fixed layer 105 and the free layer 21 of the magnetic head in the first embodiment. To be more specific, a base layer 107 is formed on a gap film 103, and the fixed layer 105, an intermediate layer 104 and the free layer 21 are formed in that order on the base layer 107. The fixed layer 105 is formed by forming a second ferromagnetic film 24 of a hard magnetic material, a nonmagnetic film 23 and a first ferromagnetic film 22 in that order on the base layer 107. The second ferromagnetic film 24 is formed of a Co—Pt alloy having the property of a permanent magnet. The nonmagnetic film 23 is formed of Ru, and the first ferromagnetic film 22 is formed of Co. The base layer 107 is formed of Cr which enhances the coercive force of the second ferromagnetic film 24.

As shown in FIG. 6, A magnetic domain control film 41 of a conductive antiferromagnetic material (a Ni—Mn alloy in this embodiment) is formed between electrodes 25a and 25b and the free layer 21. The magnetic domain control film 41 is disposed only in regions of the free layer 21 corresponding to the electrodes 25a and 25b. Since an exchange coupling magnetic field between the free layer 21 and the magnetic domain control film 41 is applied to the opposite end parts of the free layer 21, a detection region 601 between the electrodes 25a and 25b can be maintained in a single magnetic domain. Consequently, the magnetic head has a high reproducing sensitivity. The magnetic head in the second embodiment is the same in other respects as the magnetic head in the first embodiment and hence the further description thereof will be omitted.

Third Embodiment

A magnetic head in a third embodiment according to the present invention will be described with reference to FIG. 7.

Figure 7:
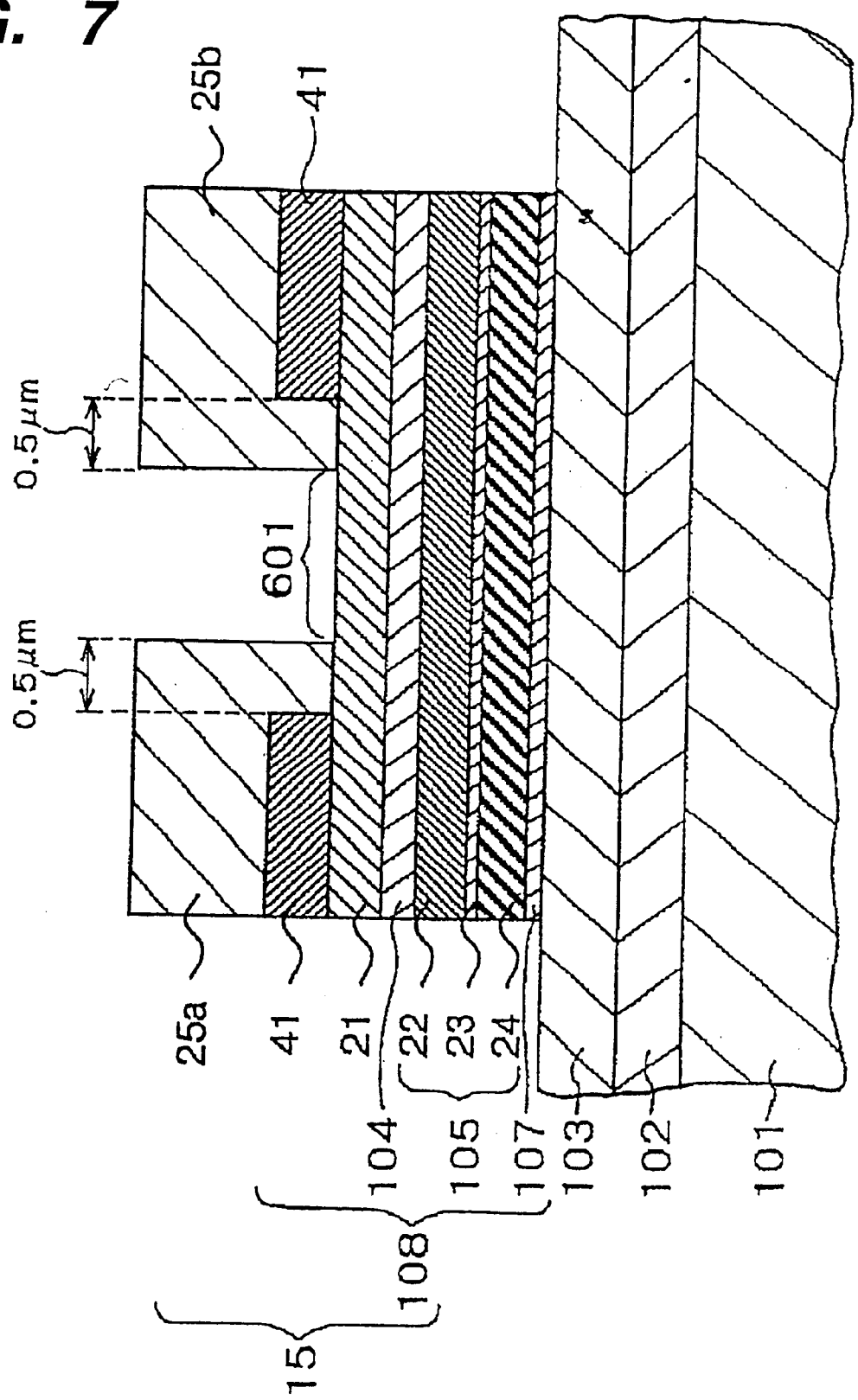
FIG. 7 is a fragmentary, typical sectional view of a magnetic head in a third embodiment according to the present invention provided with a first magnetoresistive sensor.

The magnetic head in the second embodiment shown in FIG. 7 is similar to that shown in FIG. 6. In the magnetic head in the second embodiment, a pair of portions of a magnetic domain control film 41 are spaced from each other by a distance greater than that between a pair of electrodes 25a and 25b to enable the magnetic head to be used for recording signals on and reproducing signals from recording mediums having narrow tracks, because the track width of a magnetoresistive sensor 15 is dependent on the width of the detection region 601 through which a sensing current 4 flows, i.e., the interval between the electrodes 25a and 25b. It is possible that an exchange coupling magnetic field from the pair of portions of the magnetic domain control film 41 to the free layer 21 affects the detection region 601 of the free layer 21. In such a case, the turning of the direction of magnetization of the free layer 21 is obstructed and the substantial reproducing sensitivity is deteriorated. Therefore, the pair of portions of the magnetic domain control film 41 are spaced from each other by a distance greater than that between the pair of electrodes 25a and 25b to prevent the exchange coupling magnetic field affecting the detection region 601. Experimental operation of the magnetic head shown in FIG. 7 proved that the reproducing sensitivity was increased by about 40% when the distance between the pair portions of the magnetic domain control film 41 was greater than the distance between the pair of electrodes 25a and 25b by 1 μm (0.5 μm on each side).

Modifications of Third Embodiment

Figure 8:
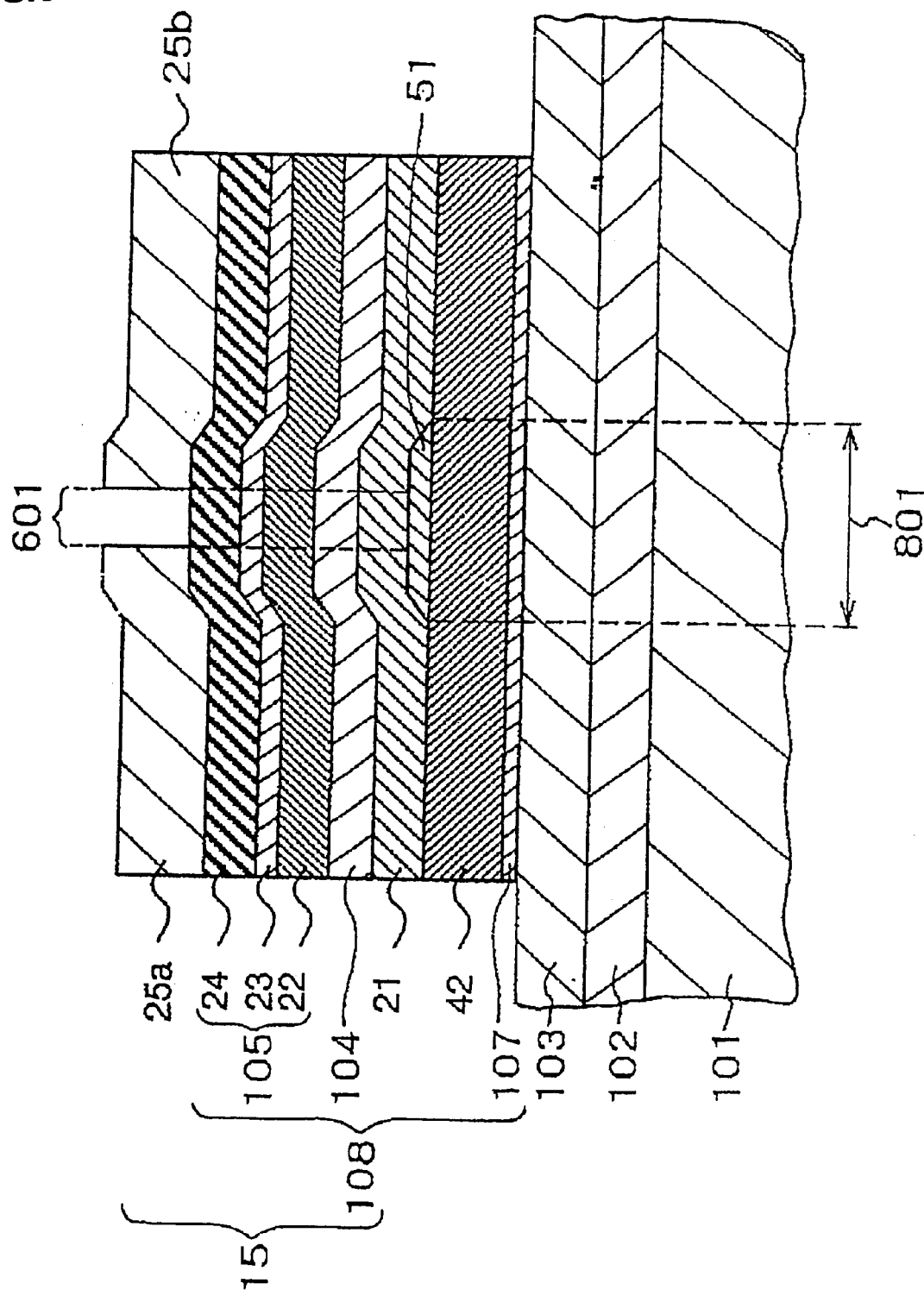
FIG. 8 is a fragmentary, typical sectional view of a magnetic head in the third embodiment provided with a second magnetoresistive sensor.
Figure 9:
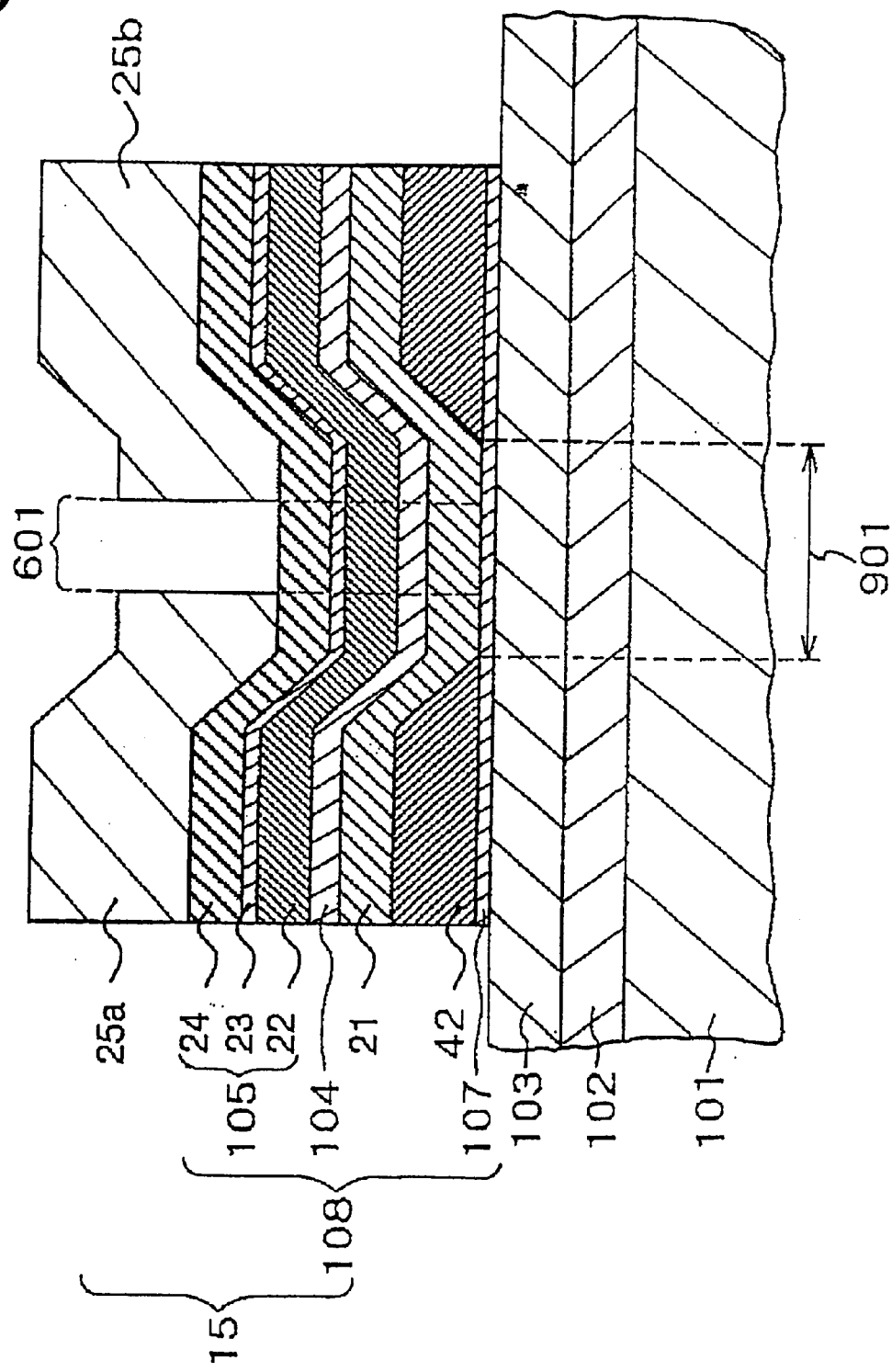
FIG. 9 is a fragmentary, typical sectional view of a magnetic head in the third provided with a third magnetoresistive sensor.
Figure 10:
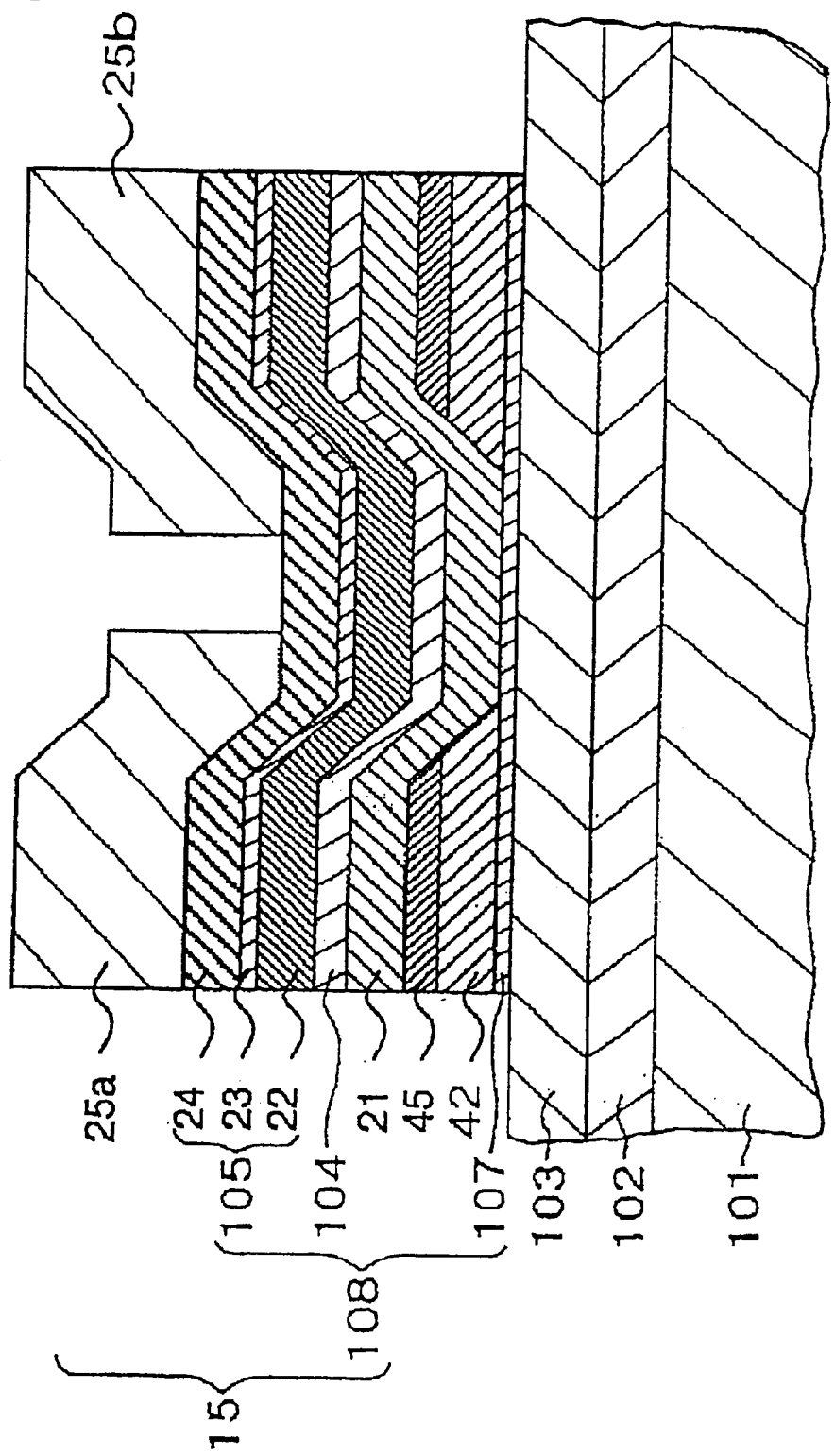
FIG. 10 is a fragmentary, typical sectional view of a magnetic head in the third embodiment provided with a fourth magnetoresistive sensor.

FIGS. 8, 9 and 10 show other magnetic heads in which the distance between the pair of portions of the magnetic domain control film 41 is greater than the distance between the pair of electrodes 25a and 25b.

Referring to FIG. 8, a magnetic domain control film 42 of an antiferromagnetic material is formed on a base film 107, and a free layer 21 is formed on the magnetic domain control film 42. An intermediate layer 104 and a fixed layer 105 are formed in that order on the free layer 21. Electrodes 25a and 25b are formed on the fixed layer 105. A nonmagnetic film 51 is sandwiched between a part of the magnetic domain control film 42 and the free layer 21 to separate a detection region 601 of the free layer 21 from the magnetic domain control film 42. The nonmagnetic film 51 has a width 801 greater than the width of the detection region 601. The magnetic head shown in FIG. 8 is the same in other respects as that shown in FIG. 6 and hence the further description thereof will be omitted. The nonmagnetic film 51 may be formed of, for example, Ta.

In the magnetic head shown in FIG. 8, the free layer 21 can be maintained in a single magnetic domain because exchange coupling occurs in the opposite end parts of the free layer 21 in contact with the magnetic domain control film 42. On the other hand, since the nonmagnetic film 51 is wider than the detection region 601, the detection region 601 of the free layer 21 is not affected by an exchange coupling magnetic field, which improves the reproducing sensitivity of the magnetic head.

A method of fabricating the magnetic head shown in FIG. 8 will be described hereinafter. The magnetic shielding film 102, the insulating gap film 103, the base layer 107, the magnetic domain control film 42 and the nonmagnetic film 51 are formed on the substrate 101. The nonmagnetic film 51 is processed to form the same in a shape shown in FIG. 8 by a reactive ion etching process. The width 801 of the nonmagnetic film 51 is 1.4 $\mu$m. The free layer 21, the intermediate layer 104 and the fixed layer 105 are formed. Subsequently, a conductive film is formed on the fixed layer 105 and the electrodes 25a and 25b are formed by patterning the conductive film. The distance between the electrodes 25a and 25b, i.e., the width of the detection region 601, is 0.4 $\mu$m. Thus, 0.5 $\mu$m wide portions of the nonmagnetic film 51 extend on the opposite sides of the detection region 601, respectively.

In the magnetic head shown in FIG. 8, the free layer 21 is disposed nearer to the substrate 101 than the fixed layer 105 to facilitate coupling the magnetic domain control film 42 and the free layer 21 by exchange coupling by forming the magnetic domain control film 42 before the free layer 21.

A magnetic head shown in FIG. 9 is similar to that shown in FIG. 8. In the magnetic head shown in FIG. 9, portions of a magnetic domain control film 42 are formed by patterning the magnetic domain control film 42 instead of forming the nonmagnetic film 51 on the magnetic domain control film 42. The distance 901 between the portions of the magnetic domain control film 42 is greater than the width of the detection region 601. Thus, the exchange coupling magnetic field from the magnetic domain control film 42 is prevented from affecting the detection region 601.

A magnetic head shown in FIG. 10 is similar to that shown in FIG. 9. In the magnetic head shown in FIG. 10, a ferromagnetic film 45 (Ni—Fe alloy film in this embodiment) is formed in regions of the surface of the magnetic domain control film 42 in contact with the free layer 21. When fabricating the magnetic head shown in FIG. 10, the magnetic shielding film 102, the insulating gap film 103, the base layer 107, the magnetic domain control film 42 and the ferromagnetic film 45 are formed on the substrate 101. Then, the magnetic domain control film 42 and the ferromagnetic film 45 are patterned simultaneously to avoid damaging the surface of the magnetic domain control film 42 by etching. It is possible that the exchange coupling of the magnetic domain control film 42 and the free layer 21 become unsatisfactory if the surface of the magnetic domain control film 42 is damaged. The magnetic domain control film 42 and the ferromagnetic film 45 are patterned simultaneously after the same has be coupled by exchange coupling. Since both the ferromagnetic film 45 and the free layer 21 are ferromagnetic, the ferromagnetic film 45 and the free layer 21 can satisfactorily be coupled magnetically even if the surface of the ferromagnetic film 45 is damaged to some extent and thence the free layer 21 and the magnetic domain control film 42 can be coupled by exchange coupling. Therefore, an exchange coupling magnetic field can be applied from the magnetic domain control film 42 to the free layer 21 without being affected by the surface damaged by patterning.

Fourth Embodiment

A magnetic head in a fourth embodiment according to the present invention will be described hereinafter with reference to FIG. 11.

Figure 11:
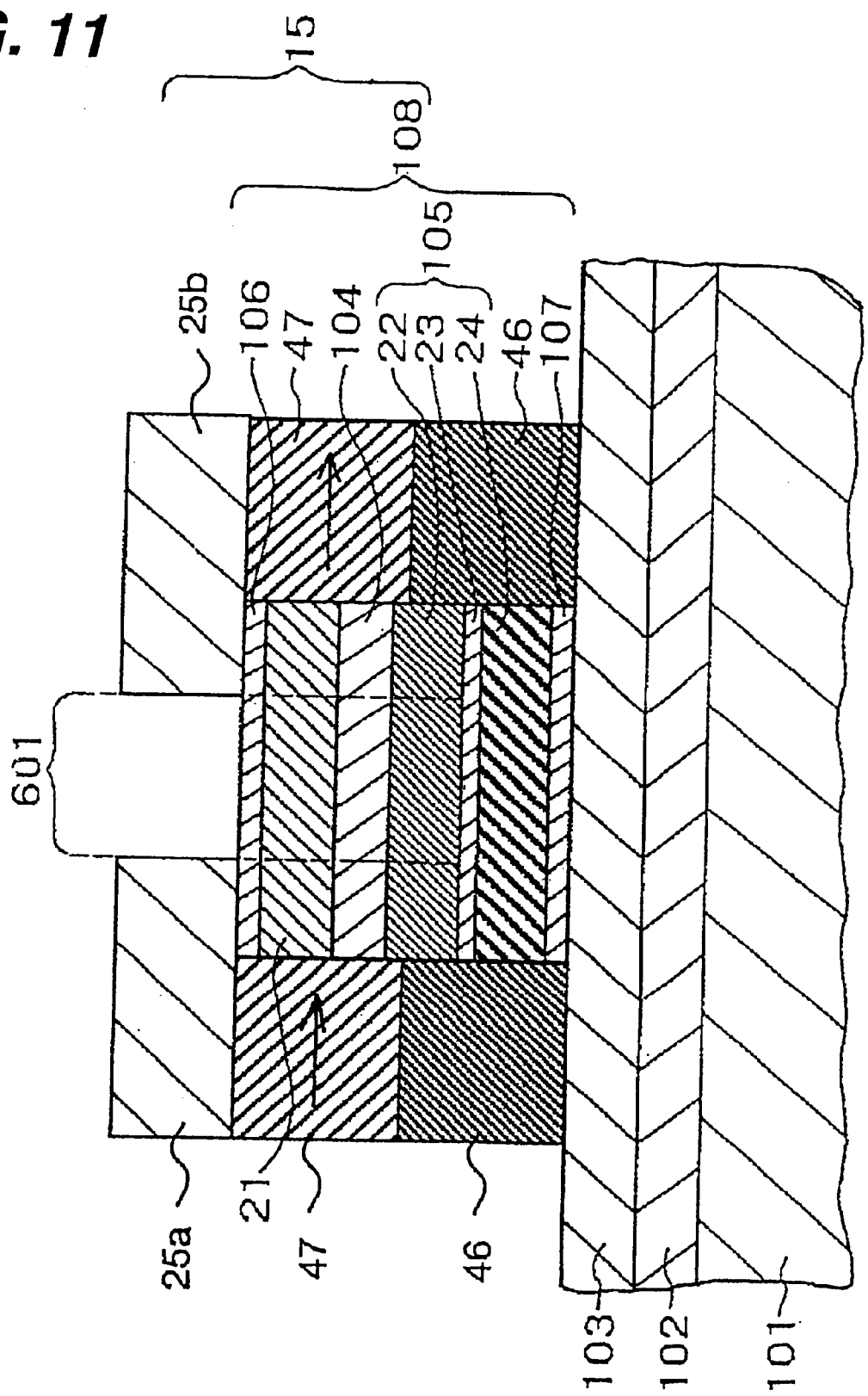
FIG. 11 is a fragmentary, typical sectional view of a magnetic head in a fourth embodiment according to the present invention provided with a magnetoresistive sensor.

In a magnetic head shown in FIG. 11, a magnetic domain control film 47 of a ferromagnetic material is formed so that portions thereof are on the opposite sides of a free layer 21, respectively. A bias magnetic field is applied to the free layer 21 from the magnetic domain control film 47 to maintain a detection region 601 in the free layer 21 in a single magnetic domain.

The construction of a spin valve film 108 is the same as that shown in FIG. 6 except that a cap layer 106 is disposed on a free layer. The spin valve film 108 is patterned and an antiferromagnetic film 46 and the magnetic domain control film 47 are formed on the opposite sides of the spin valve film 108. The magnetic domain control film 47 is a ferromagnetic film (a Ni—Fe alloy film in this embodiment). The antiferromagnetic film 46 is formed to magnetize the magnetic domain control film 47 in the direction along the width of the detection region 601 by exchange coupling. A magnetic field is applied from the magnetic domain control film 47 to the free layer 21 in the direction of the width of the detection region 601 to maintain the free layer 21 in a single magnetic domain.

Fifth Embodiment

A magnetic head in a fifth embodiment according to the present invention will be described hereinafter with reference to FIG. 12.

Figure 12:
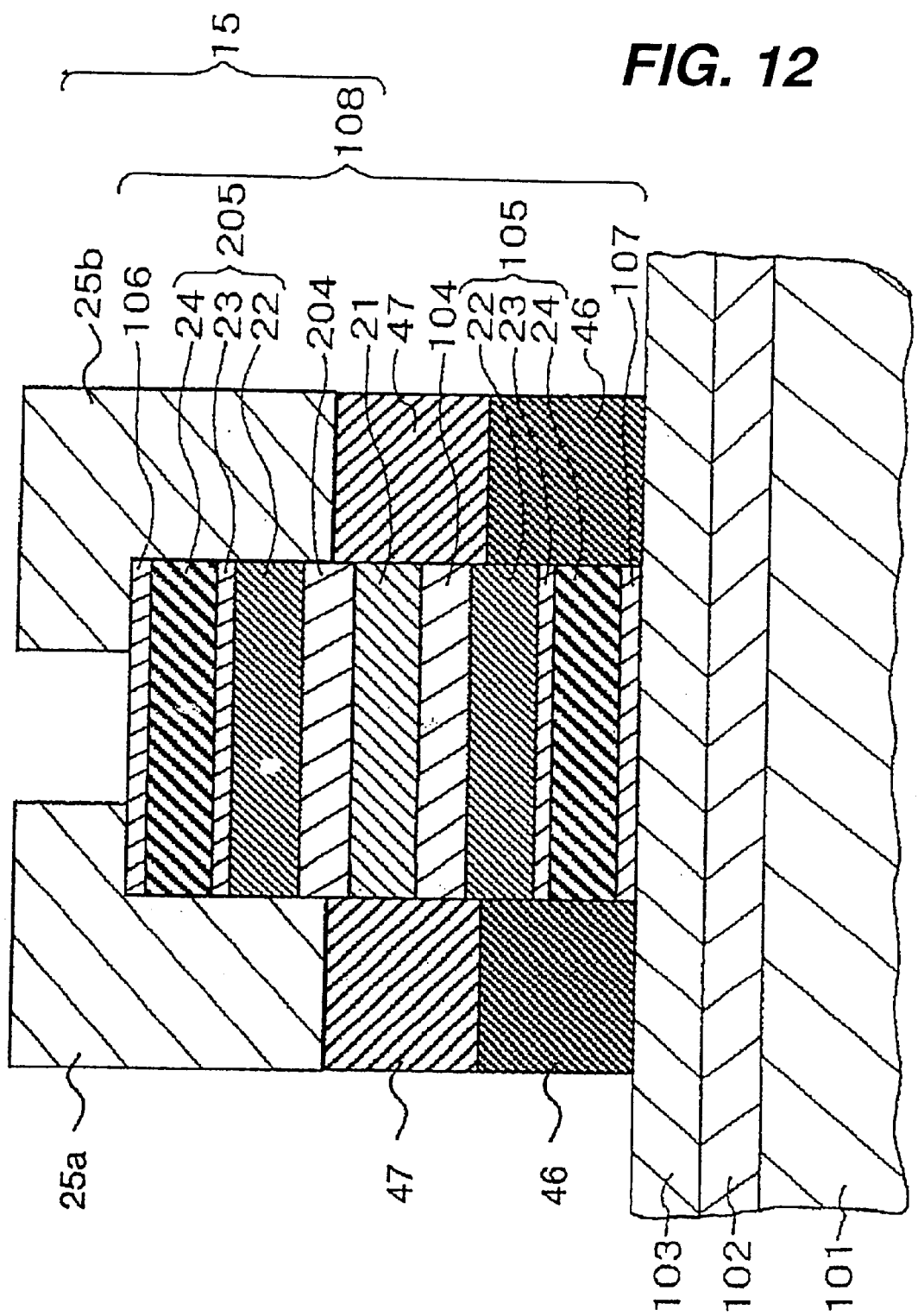
FIG. 12 is a fragmentary, typical sectional view of a magnetic head in a fifth embodiment according to the present invention provided with a magnetoresistive sensor.

In a magnetic head shown in FIG. 12, intermediate layers 104 and 204 are formed on the lower and the upper surface of a free layer 21, respectively, a fixed layer 105 underlies the intermediate layer 104, and a fixed layer 205 overlies the intermediate layer 204. Since a GMR effect is produced in the interfaces between the layers, the fixed layers 105 and 205 are formed on the lower and the upper side of the free layer 21, respectively, to use the opposite surfaces of the free layer 21. Thus, the resistance change $\Delta R$ is increased to enhance reproducing sensitivity. The intermediate layer 204 shown in FIG. 12, similarly to the intermediate layer 104, is a nonmagnetic film. The fixed layer 205 is the same in construction as the fixed layer 105. In the fixed layer 205, a second ferromagnetic film 24 farther from the free layer 21 is formed of a hard magnetic material. The magnetic head shown in FIG. 12 is the same in other respects including a magnetic domain control film 47 as the magnetic head shown in FIG. 11, and hence the further description thereof will be omitted.

As mentioned above, in the preferred embodiments of the present invention, the fixed layer of the magnetoresistive sensor employing the spin valve film is a three-layer structure consisting of the first ferromagnetic film 22, the nonmagnetic film 23 and the second ferromagnetic film 24, the second ferromagnetic film 24 farther from the free layer 21 than the first ferromagnetic film 22 is formed of a hard magnetic material (material having the property of a permanent magnet). Thus, the direction of magnetization of the first ferromagnetic film 22 on the side of the free layer 21 can firmly be pinned down. Consequently, the magnetic head has improved reproducing sensitivity and improved heat resistance. Furthermore, reproducing sensitivity can further enhanced by maintaining the free layer 21 in a single magnetic domain, and forming the fixed layers on the upper and the lower side of the free layer, respectively.

Although the second ferromagnetic film 24 of the fixed layer 105 in the foregoing embodiments is formed of a Co—Cr—Pt alloy or a Co—Pt alloy, the second ferromagnetic film 24 may be formed of any suitable hard magnetic material (material having the property of a permanent magnet) other than those alloys. For example, the second ferromagnetic film 24 may be formed of a material containing an alloy CoM, where M is Pt, Cr or Ta, or an alloy of two or all of Pt, Cr and Ta, as a principal component.

The antiferromagnetic magnetic domain control films 41 and 42 may be formed of any suitable antiferromagnetic material other than the Ni—Mn alloy used by the foregoing embodiments. For example, the magnetic domain control films 41 and 42 may be formed of an antiferromagnetic material selected from an Mn-bearing alloys, Ni oxides, Co oxides, Fe oxides or the like.

The magnetic heads in the foregoing embodiments using GMR effect use the three-layer fixed layers 105 and 205 each including the film of a hard magnetic material. However, the three-layer fixed layer including the film of the hard magnetic material is applicable to a magnetic head using TMR (tunnel magnetoresistance) effect. Since the fixed layer employed in the foregoing embodiments is highly effective in pinning down the direction of magnetization and heat-resistant, the TMR magnetoresistive sensor employing the fixed layer has a high reproducing sensitivity and a high environmental capability. A magnetic head provided with the TMR magnetoresistive sensor has a high reproducing sensitivity and a high environmental capability.

As is apparent from the foregoing description, the present invention provides a magnetic head provided with a magnetoresistive sensor provided with a fixed layer hardly susceptible to heat and capable of creating a pinning magnetic field of a sufficient intensity, and capable of reproducing signals in satisfactory linearity.

What is claimed is:

1. A magnetic head comprising:
   a magnetoresistance effect film including a free layer, a fixed layer and an intermediate layer sandwiched between the free layer and the fixed layer; and
   a pair of electrodes to supply a current to the magnetoresistance effect film;
   wherein the free layer is formed of a ferromagnetic material, the intermediate layer is formed of a nonmagnetic material, and the fixed layer comprises first and second ferromagnetic films and a nonmagnetic film sandwiched between the first and the second ferromagnetic films, and
   the second ferromagnetic film farther from the free layer than the first ferromagnetic film is formed of a material comprising a Co alloy including at least Pt, Cr or Ta, the second ferromagnetic film magnetized to form a permanent magnet and a magnetization of the first ferromagnetic film and that of the second ferromagnetic film are coupled in an antiferromagnetic coupling fashion.

2. The magnetic head according to claim 1, wherein the respective directions of magnetization of the first and the second ferromagnetic films are perpendicular to the direction of magnetization of the free layer in a state where any external magnetic field is not applied to the free layer.

3. The magnetic head according to claim 1, further comprising an antiferromagnetic film for applying a magnetic exchange coupling magnetic field to the free layer to maintain a detection region in the free layer in which current supplied through the electrodes flows in a single magnetic domain.

4. The magnetic head according to claim 3, wherein the antiferromagnetic film is formed so as to be in contact with regions of the surface of the free layer excluding the detection region.

5. A magnetic head according to claim 1, wherein said magnetoresistance effect film is a tunnel mangetoresistance effect film.

6. A magnetic head comprising:
   a magnetoresistance effect film including a fixed layer having a fixed magnetization;
   wherein the fixed layer comprises first and second ferromagnetic films and a nonmagnetic film sandwiched between the first and the second ferromagnetic films, and
   the second ferromagnetic film is formed of a material magnetized to form a permanent magnet, and a magnetization of the first ferromagnetic film and that of the second ferromagnetic film are coupled in an antiferromagnetic coupling fashion.

7. A magnetic head comprising:
   a magnetoresistance effect film comprising a free layer, a first fixed layer disposed on an upper side of the free layer, a second fixed layer disposed on a lower side of the free layer, a first intermediate layer sandwiched between the first fixed layer and the free layer, and a second intermediate layer sandwiched between the second fixed layer and the free layer; and
   a pair of electrodes for supplying current to the magnetoresistance effect film;
   wherein the free layer is formed of a ferromagnetic material, and the first and the second intermediate layers are formed of a nonmagnetic material;
   the first fixed layer comprises first and second ferromagnetic films and a nonmagnetic film sandwiched between the first and the second ferromagnetic films, the second fixed layer comprises third and fourth ferromagnetic films, a nonmagnetic film sandwiched between the third and fourth ferromagnetic films; and
   the second ferromagnetic film farther from the free layer than the first ferromagnetic film and the fourth ferromagnetic film farther from the free layer than the third ferromagnetic film are formed of a material comprising a Co alloy including at least Pt, Cr or Ta, the second ferromagnetic film magnetized to form a permanent magnet, a magnetization of the first ferromagnetic film and that of the second ferromagnetic film are coupled in an antiferromagnetic coupling fashion.

8. The magnetic head according to claim 7 further comprising an antiferromagnetic film for applying a bias magnetic field to the free layer to maintain a detection region of the free layer through which a current supplied through the electrodes flows in a single magnetic domain.

9. A magnetic storage and retrieval apparatus comprising:
   a magnetic disk; a rotative driving means for rotating the magnetic disk; and a magnetic head for recording information on and reproducing information from the magnetic disk;
   wherein the magnetic head comprises: a magnetoresistance effect film comprising a free layer, a fixed layer and intermediate layer sandwiched between the free layer and the fixed layer, and a pair of electrodes for supplying current to the magnetoresistance film,
   the free layer is formed of a ferromagnetic material and the intermediate layer is formed of a nonmagnetic material,
   the fixed layer comprises first and second ferromagnetic films, and a nonmagnetic film sandwiched between the first and the second ferromagnetic films,
   the second ferromagnetic film farther from the free layer than the first ferromagnetic film is formed of a material comprising a Co alloy including at least Pt, Cr or Ta, the second ferromagnetic film magnetized to form a permanent magnet, and a magnetization of the first ferromagnetic film and that of the second ferromagnetic film are coupled in an antiferromagnetic coupling fashion.

10. A magnetic storage and retrieval apparatus comprising:

a magnetic disk; a rotative driving means for rotating the magnetic disk; and a magnetic head for recording information on and reproducing information from the magnetic disk;

wherein the magnetic head comprises: a magnetoresistance effect film having a fixed layer magnetized in a fixed direction of magnetization; the fixed layer comprises first and second ferromagnetic films and a nonmagnetic film sandwiched between the first and the second ferromagnetic films and the second ferromagnetic film is formed of a material comprising a Co alloy including at least Pt, Cr or Ta, the second ferromagnetic film magnetized to form a permanent magnet, and a magnetization of the first ferromagnetic film and that of the second ferromagnetic film are coupled in an antiferromagnetic coupling fashion.

11. A magnetic head comprising:

a giant magnetoresistance effect film comprising a free layer, a fixed layer and an intermediate layer sandwiched between the free layer and the fixed layer; and a pair of electrodes for supplying current to the giant magnetoresistance effect film;

wherein the free layer is formed of a ferromagnetic material, and the intermediate layer is formed of a nonmagnetic material;

the fixed layer has first and second ferromagnetic films and a nonmagnetic film sandwiched between the first and the second ferromagnetic films, and the second ferromagnetic film farther from the free layer than the first ferromagnetic film is formed of a material comprising a Co alloy including at least Pt, Cr or Ta, the second ferromagnetic film magnetized to form a permanent magnet harder than that forming the first ferromagnetic film, and a magnetization of the first ferromagnetic film and that of the second ferromagnetic film are coupled in an antiferromagnetic coupling fashion.

12. A magnetic head comprising a giant magnetoresistance effect film including a fixed layer having fixed magnetization;

wherein the fixed layer comprises first and second ferromagnetic films and a nonmagnetic film sandwiched between the first and the second ferromagnetic films, and the second ferromagnetic film is formed of a ferromagnetic material comprising a Co alloy including at least Pt, Cr or Ta, the second ferromagnetic film magnetized to form a permanent magnet harder than that forming the first ferromagnetic film and that of the second ferromagnetic film are coupled in an antiferromagnetic coupling fashion.

13. A magnetic storage and retrieval apparatus comprising:

a magnetic disk; a rotative driving means for rotating the magnetic disk; and a magnetic head for recording information on and reproducing information from the magnetic disk;

wherein said magnetic head comprises a giant magnetoresistance effect film having a free layer, a fixed layer and an intermediate layer sandwiched between the free layer and the fixed layer; and a pair of electrodes for supplying current to the giant magnetoresistance effect film, the free layer is formed of a ferromagnetic material and the intermediate layer is formed of a nonmagnetic material, the fixed layer has first and second ferromagnetic layers, and a nonmagnetic layer sandwiched between the first and second ferromagnetic films, and the second ferromagnetic film farther from the free layer than the first ferromagnetic layer is formed of a ferromagnetic material comprising a Co alloy including at least Pt, Cr or Ta, the second ferromagnetic film magnetized to form a permanent magnet harder than that forming the first ferromagnetic film, and a magnetization of the first ferromagnetic film and that of the second ferromagnetic film are coupled in an antiferromagnetic coupling fashion.

14. A magnetic storage and retrieval system comprising:

a magnetic disk; a rotative driving means for rotating the magnetic disk; and a magnetic head for recording information on and reproducing information from the magnetic disk;

wherein the magnetic head has a giant magnetoresistance effect film having a fixed magnetization, and the fixed layer has first and second ferromagnetic films and a nonmagnetic film sandwiched between the first and the second ferromagnetic films and the second ferromagnetic film is formed of a ferromagnetic material comprising a Co alloy including at least Pt, Cr or Ta, the second ferromagnetic film magnetized to form a permanent magnet harder than that forming the first ferromagnetic film, and a magnetization of the first ferromagnetic film and that of the second ferromagnetic film are coupled in an antiferromagnetic coupling fashion.

* * * * *